Nov. 28, 1967 R. J. CLARK 3,355,723
DIODE-CAPACITOR BIT STORAGE CIRCUIT
Filed May 10, 1965
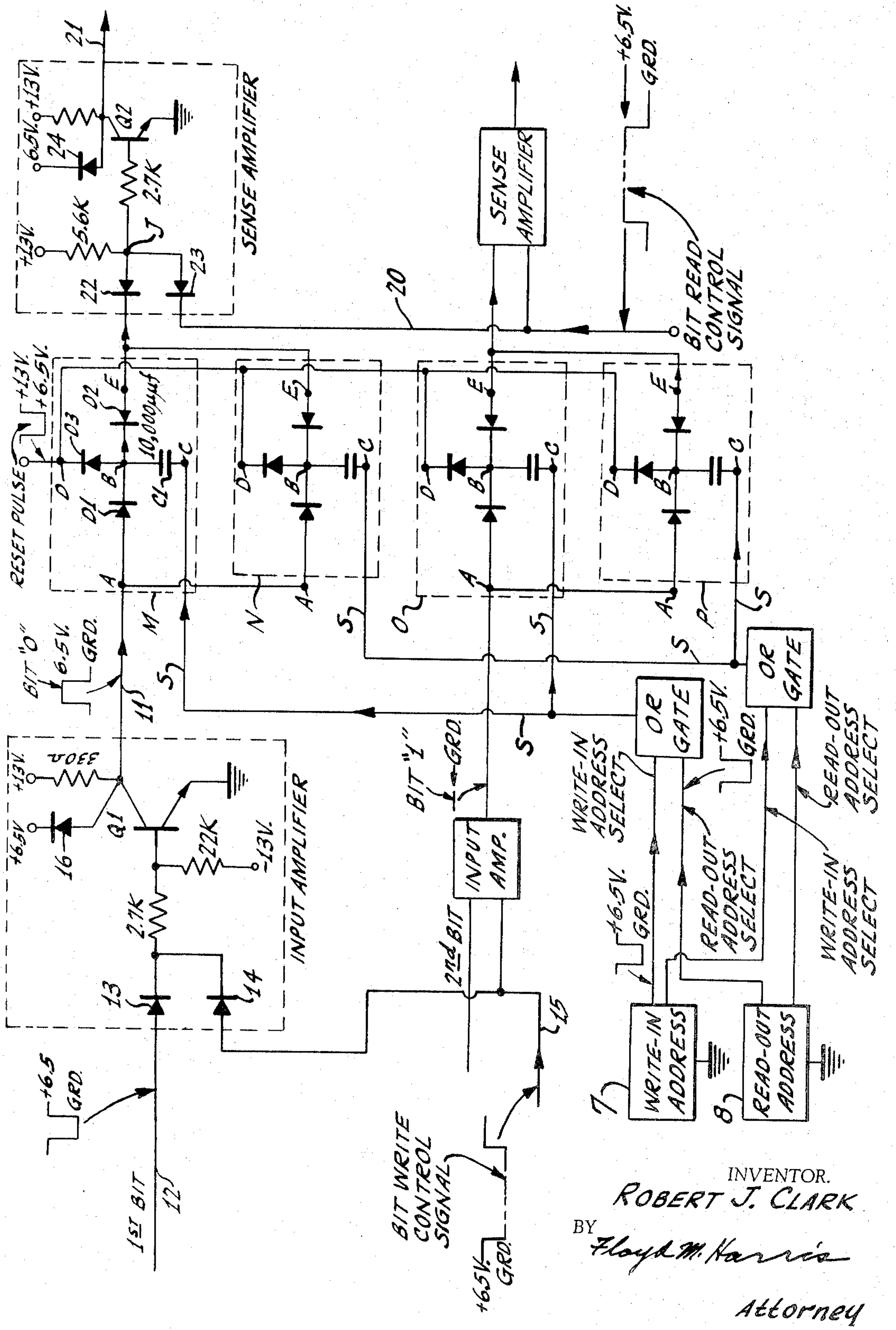
INVENTOR.
ROBERT J. CLARK
BY Floyd M. Harris
Attorney 3,355,723
DIODE-CAPACITOR BIT STORAGE CIRCUIT

Robert John Clark, Dorion, Quebec, Canada, assignor to Radio Corporation of America, a corporation of Delaware Filed May 10, 1965, Ser. No. 454,562
9 Claims. (Cl. 340—173)

This invention relates to storage circuits, and particularly to bit storage circuits for use, by way of example, in computer memories and storage buffers.

An object of the invention is to provide an improved bit storage circuit.

A further object of the invention is to provide an improved diode-capacitor storage circuit.

A further object of the invention is to provide an improved diode-capacitor bit storage circuit requiring a minimum number of leads.

A still further object of the invention is to provide an improved storage circuit that has a nondestructive read-out.

In accordance with a preferred embodiment of the present invention, the bit storage circuit comprises a storage capacitor, a diode through which the bit to be stored is applied to one side of the capacitor, a second diode through which, on read-out, the stored bit is applied to an output terminal, a third diode through which a reset pulse may be applied to the capacitor, and means for applying either write-in address select pulses or read-out address select pulses over one lead to the other side of the capacitor. One feature of the invention is that there is no requirement that two separate leads go to the storage circuit for carrying the write-in address select pulses and the read-out address select pulses.

The invention will be described in detail with reference to the single figure of the drawing which is a circuit diagram of one embodiment of the invention.

Referring to the drawing, four diode-capacitor stores are illustrated by way of example. These four stores are shown within the dotted line blocks M, N, O and P, respectively. Each diode-capacitor store comprises three diodes and a capacitor.

To simplify the illustration, stores for only a two-bit code are shown, and it is assumed that the two bits, i.e., the first bit and the second bit, are fed simultaneously into the stores illustrated. These stores may be the stores of a buffer which is fed from a memory.

Also, stores for only two codes are illustrated. The stores M and O are for the first and second bits, respectively, of the first code; the stores N and P are for the first and second bits, respectively, of the second code.

Since the diode-capacitor storage circuits are identical, a description of one of them applies to the others. Refer to the store M which comprises diodes D1 and D2 having their cathodes connected to a bit store terminal point B, a diode D3 having its anode connected to the point B, and a capacitor C1 having its upper side connected to the point B.

The bit to be stored is applied to the input terminal A and thus to the anode of D1. The address select pulses (for both write-in and read-out) are applied to the lower side of capacitor C1, this circuit point being the address select terminal marked C. In this specific example, capacitor C1 has a value of 10,000 micro-microfarads. The stored bit is read out through diode D2, the output terminal being marked E. The reset pulse is applied to the reset terminal D and through the diode D3 to the point B.

It should be noted that for write-in and read-out only one lead into a store circuit (the lead S) is required since write-in address select pulses and read-out select pulses are supplied over the same lead S to the terminal C.

The operation of the diode-capacitor store will now be described. In the condition immediately following reset (described hereinafter), which condition will be referred to as the reset condition, the store is ready to have bits read in. In this reset condition the capacitor C1 has bit "1" stored thereon. Note that bit "1" is represented by a reference potential on the store input terminal A, this being ground potential in the present example. The voltages at the various circuit points during this reset condition are as follows:

Input terminal A is at the reference or ground potential.

Address select terminal C is at plus 6.5 volts above the reference or ground potential.

Reset terminal D is at plus 13 volts above the reference or ground potential.

Output terminal E is at the reference or ground potential, since it connects to a point J in the sense amplifier that is at ground potential during the reset condition as described hereinafter. It may be noted here that during this reset condition a bit read-control signal, which is applied to the sense amplifier, is of zero or ground potential so that a diode 23 conducts to hold the point J to zero or ground potential.

The bit store terminal B is at plus 6.5 volts above ground since capacitor C1 has no charge and the terminal C is at plus 6.5 volts.

*Write-in*

If the bit written in is bit "0," the action of the storage circuit is as follows, the store initially being in the previously described reset condition:

The bit "0" raises input terminal A to plus 6.5 volts above ground.

Simultaneously with the occurrence of bit "0" at terminal A, a write-in address select pulse is applied from a write-in address unit 7 by way of an OR gate and a lead S to the address select terminal C. This is a negative pulse that drives the terminal C (and B) to ground. Therefore the 6.5-volt bit "0" pulse charges capacitor C1, by way of diode D1, to 6.5 volts. This charge occurs quickly since the charge circuit has a short time constant as will be described hereinafter with reference to the input amplifier.

Upon termination of the write-in address select pulse (and termination of the bit "0" pulse) the terminal C again goes to plus 6.5 volts. Since capacitor C1 is charged to plus 6.5 volts, the bit store terminal B is now at plus 13 volts. This is the condition with bit "0" stored. The output terminal E remains at reference or ground potential, the diode D2 being nonconducting.

If the bit written in is bit "1," there is no voltage change at input terminal A. Simultaneously with the occurrence of bit "1" at terminal A, a write-in address select pulse is applied to address select terminal C driving it (and terminal B) to ground potential. No charge is placed on capacitor C1 since terminals A, C and E are at the same potential. The terminal E, like terminals A and C, is at ground potential because the point J in the sense amplifier is held at ground potential by the bit read-control signal which is at ground potential during write-in, thus holding point J at ground potential by way of a conducting diode 23 as described later.

Upon termination of the write-in address select pulse (and termination of the bit "1" pulse) the terminal C returns to plus 6.5 volts, and the bit store terminal B returns to plus 6.5 volts. This is the condition for bit "1" store. The output terminal E remains at reference or ground potential, the diode D2 being nonconducting.

*Read-out*

Consider now the action of the storage circuit on read-out.

For read-out, the bit read-out control signal applied to the sense amplifier is raised to plus 6.5 volts. This cuts off the diode 23 in the sense amplifier so that the points J and E go to about plus 4 volts as explained hereinafter.

Assume that bit "1" is stored, that is, the terminal B is at set "1" so that it is at plus 6.5 volts. Upon the occurrence of a read-out select pulse supplied from a read-out address unit 8 by way of the OR gate, the terminal C is dropped from 6.5 volts to ground potential, thus dropping terminal B to ground potential. This causes output terminal E to drop to ground potential also. Terminal E drops to ground potential because, being connected by way of a diode 22 to the point J at plus 4 volts in the sense amplifier, the diodes 22 and D2 conduct when point B drops to ground. Since these diodes have very low impedance, the point J and the terminal E are dropped to ground. When the point J in the sense amplifier J drops to ground, the sense amplifier output lead goes to plus 6.5 volts as described hereinafter, thus generating a bit "1" output.

As discussed later, when diodes 22 and D2 conduct, the current flow through them goes into capacitor C1 and charges it a small amount. This charge, however, is so small that a substantial number of such charges may be applied without substantially changing the charge condition of C1.

Upon termination of the read-out address select pulse, the terminal C is again placed at plus 6.5 volts, placing terminal B at substantially 6.5 volts. Actually, terminal B will be at a small fraction of a volt above 6.5 volts. This is a non-destructive read-out since there has been only a minor change in the charge condition of capacitor C1.

In the example illustrated, the OR gate is one that does not reverse the signal polarity. It is provided so that when the write-in address select lead is driven to ground potential, the lead S will not be held to 6.5 volts by the read-out address select lead. The lead S is at plus 6.5 volts when both address select leads are at plus 6.5 volts; it is at ground potential when either of the address select leads is at ground potential.

Assume that bit "0" is stored, that is, the terminal B is at set "0" so that it is at plus 13 volts. Upon the occurrence of a read-out select pulse, the terminal C is dropped to ground potential, thus dropping terminal B to plus 6.5 volts (the capacitor C1 having a 6.5 volt charge). Since terminal B drops only to plus 6.5 volts, diodes D2 and 22 do not conduct and there is no change in the voltage at the output terminal E and the terminal J remains at plus 4 volts so that the sense amplifier output lead remains at ground potential, thus generating a bit "0" output.

Upon termination of the read-out address select pulse, the terminal C is again placed at plus 6.5 volts, thus again placing terminal B at plus 13 volts, the set "0" condition. This also is a nondestructive read-out since there has been no change in the charge condition of capacitor C1.

*Reset*

When it is desired to reset the storage circuits to put them in condition for again storing the bits of character codes, for example, a reset pulse is applied to the terminal D. This is a negative pulse that drops terminal D from its normal potential of plus 13 volts to plus 6.5 volts. The normal potential on terminal D may be greater than plus 13 volts, but in the present example it must be dropped to plus 6.5 volts for reset. At the time the reset pulse is applied, terminal C is at plus 6.5 volts. If it is bit "1" that is stored, capacitor C1 has no charge, and terminal B is also at plus 6.5 volts. Therefore, placing terminal D at plus 6.5 volts by the reset pulse has no effect. This should be expected since the bit "1" store condition is also the reset condition.

If it is bit "0" that is stored, capacitor C1 has a plus 6.5 volt charge, and terminal B is at plus 13 volts. When terminal D is dropped to plus 6.5 volts by the reset pulse, capacitor C1 discharges through diode D3, terminal B dropping to plus 6.5 volts. Upon the termination of the reset pulse, the terminal B remains at plus 6.5 volts. The storage circuit is now at the reset condition (and also at bit "1" set).

*Input amplifier*

The bits are applied or fed in to the storage circuits by way of input amplifiers. The circuit of a suitable input amplifier, illustrated for feeding in the first bit, is shown by way of example. It comprises an NPN type transistor Q1 having a collector output lead 11 connected to terminal A of store M. The emitter is connected to ground. The bit is applied from an input lead 12 through a diode 13 and a 2.7K ohm resistor ($K=1000$) to the transistor base. The input lead 12 is normally at plus 6.5 volts. A bit "0" pulse drives the lead 12 to ground potential. A bit "1" does not change the potential of lead 12.

A 22K ohm resistor connects the base of Q1 to a minus 13 volts source. During write-in, a bit write-control pulse is applied to a lead 15. This pulse is produced by dropping the write-control signal voltage from plus 6.5 volts to ground potential. The pulse is applied by way of lead 15 and a diode 14 to the input end of the 2.7K ohm resistor so that transistor Q1 is forward biased properly for amplifying the input signal. Thus, a bit "0" input raises the output lead 11 (normally at ground potential) to plus 6.5 volts, this being the voltage at which lead 11 is clamped by a diode 16.

The bit write-control signal pulse is applied over the lead 15 for the time period that it is desired to write bits into the storage circuits. When the bit write-control signal pulse is not being applied, a positive 6.5 volts is being applied by way of lead 15 to diode 14 so that it conducts and saturates Q1 so that lead 11 is clamped to ground and cannot pass noise or other unwanted signal.

Referring now to the charging of capacitor C1 by a bit "0" pulse, in the present example this pulse has a duration of approximately three microseconds, and the write-in address select pulse also has a duration of approximately three microseconds. Thus, capacitor C1 has approximately three microseconds within which to reach its charge of 6.5 volts. Since the charging circuit for C1 has a short time constant, the 6.5 volts charge is readily reached within this time. The charging circuit for C1 is from the plus 13 volts battery or other low impedance voltage source for the transistor collector, through the 330 ohm collector resistor, through diode D1, capacitor C1 to ground, and back to the 13 volt source. The charging time constant is approximately three microseconds.

*Sense amplifier*

The output terminals E of the storage circuits are connected to sense amplifiers. The circuit of a suitable sense amplifier is shown by way of example for the storage circuits that store the first bit. It comprises an NPN type transistor Q2 having a collector output lead 21 on which will appear the bits read-out. The emitter is connected to ground. The storage circuit output terminal E is connected through a diode 22 (connected in the same direction as diode D2) and through a 2.7K ohm resistor to the base of Q2.

A 5.6K ohm resistor is connected at one end to the junction point J of diode 22 and the 2.7K ohm resistor and is connected at the other end to plus 13 volts. During read-out of the storage circuits, the bit read-control signal pulse of plus 6.5 volts is being applied by way of a lead 20 to the cathode of a diode 23 which has its anode connected to the junction point J. Thus, during read-out the diode 23 is cut off, the junction point J is at about plus 4 volts, and Q2 is forward biased and in amplifying condition. The point J is at about 4 volts because, with the diode 23 cut off, the current flow through the 5.6K and 2.7K resistors is the base-emitter current of Q2, and with the two resistor values assumed in this example, the 13 volts applied to the 5.6K resistor is dropped to about 4 volts above ground at the junction J. Thus, the points J and E are at about plus 4 volts. The voltage at these points preferably should not exceed plus 6.5 volts in the present example because, otherwise, on read-out of bit "0" the capacitor C1 will unnecessarily receive a slight charge.

When read-out is not desired, the cathode of diode 23 is maintained at ground potential by the bit read-control signal so that the diode 23 conducts. The resulting current flow through the diode 23 places junction point J at ground potential, so that Q2 is biased to cut-off and is in nonamplifying condition.

Since a bit "0" read out does not change the potential at output terminal E, the positive potential on the base of Q2 remains unchanged, the output lead 21 which was at substantially ground potential, since Q2 was conducting rather heavily, remains at ground potential. Thus, the bit "0" output is generated.

However, a bit "1" read out changes the potential of terminal B from 6.5 volts to ground. This changes the potential of terminal E from 6.5 volts to ground, as is explained below, thus reducing the voltage on the base of Q2 so that output lead 21 goes to 6.5 volts, lead 21 being clamped to 6.5 volts by means of a diode 24. Thus, the bit "1" output is generated.

The output terminal E drops to ground potential when terminal B drops to ground for the reason that current flows through diodes 22 and D2 so that they have very low impedance and tie the terminals E and J substantially to the potential of terminal B. Since this current flow goes into capacitor C1, C1 is charged slightly, but only a very small amount. The charge is small because the read-out address select pulse applied to terminal C is of very short duration, only one-half microsecond in the present example, and because the time constant of the charging circuit is comparatively long. The time constant is determined by the 5.6K ohm resistor connected to point J and by the capacitor C1. The charging circuit is from the 13 volt source (a battery or other low impedance voltage supply), through the 5.6K ohm resistor, through diodes 22 and D2 and capacitor C1 to ground, and back to the 13 volt supply. The time constant in the present example is about 56 microseconds.

Each read-out of bit "1" changes the charge on capacitor C1 by only a small fraction of a volt. In the present example, if there are seven read-outs of bit "1" for instance, the capacitor having zero charge initially at bit "1" set will be charged only to about 0.6 volt after seven read-outs. Thus, it is a nondestructive read-out, since the read-out causes only a minor change in the capacitor charge.

The values given for resistors, voltages and the storage capacitor are given merely by way of example. Other suitable values may be employed.

Also, the various diodes need not be connected in the particular direction shown in this example. They may be reversed, in which case the transistors Q1 and Q2 are of the PNP types, and the polarity of the voltages is reversed.

What is claimed is:

1. A bit storage circuit comprising a storage capacitor having a bit store terminal connected to one side of said capacitor and an address select terminal connected to the other side of said capacitor, three diodes each having a cathode electrode and an anode electrode, the first of said diodes having one of its electrodes connected to said bit store terminal and having its other electrode connected to a bit input terminal, the second of said diodes having an electrode like said one electrode connected to said bit store terminal and having its other electrode connected to a bit output terminal, and the third of said diodes having an electrode like said other electrode connected to said bit store terminal and having its other electrode connected to a reset terminal.

2. The invention according to claim 1 wherein during the normal or reset condition of said storage circuit there is means for maintaining said address select terminal at a certain potential and polarity and for maintaining said bit output terminal also at said polarity and at a potential not exceeding said certain potential, said polarity at said bit output terminal being in the direction tending to make said second diode conduct, means for maintaining said bit input terminal at a potential that maintains said first diode nonconducting, and means for maintaining said reset terminal at a potential that is at least twice said certain potential and of a polarity that maintains said third diode nonconducting.

3. The invention according to claim 2 wherein, for writing a bit into said storage circuit, means is provided for applying said bit to said bit input terminal and changing its potential momentarily to a value tending to make said first diode conductive and means for momentarily and simultaneously so changing the potential of said address select terminal that said first diode becomes conductive whereby said capacitor receives a charge which it holds at the end of said bit write-in, and wherein, for reading out said bit, there is means for momentarily changing the potential of said address select terminal to a value that changes the potential of said bit store terminal to a value having such relation to the potential of said bit output terminal that said second diode is nonconducting.

4. The invention according to claim 3 wherein, for resetting said storage circuit, means is provided for changing the potential of said reset terminal to a value that causes said capacitor to discharge through said third diode to zero charge.

5. A bit storage circuit comprising a storage capacitor having a bit store terminal connected to one side of said capacitor and an address select terminal connected to the other side of said capacitor, three diodes each having a cathode electrode and an anode electrode, the first of said diodes having one of its electrodes connected to said bit store terminal and having its other electrode connected to a bit input terminal, the second of said diodes having an electrode like said one electrode connected to said bit store terminal and having its other electrode connected to a bit output terminal, and the third of said diodes having an electrode like said other electrode connected to said bit store terminal and having its other electrode connected to a reset terminal, means for applying to said bit input terminal the bit to be written in, means for simultaneously applying a write-in address select pulse to said address select terminal, and means for reading out said bit so that it appears on said bit output terminal, said last means including means for applying a read-out address select pulse to said address select terminal.

6. A bit storage circuit comprising a storage capacitor having a bit store terminal connected to one side of said capacitor and an address select terminal connected to the other side of said capacitor, a first diode having its cathode connected to said bit store terminal and having its anode connected to a bit input terminal, a second diode having its cathode connected to said bit store terminal and having its anode connected to a bit output terminal, and a third diode having its anode connected to said bit store terminal and having its cathode connected to a reset terminal.

7. A bit storage circuit comprising a storage capacitor having a bit store terminal connected to one side of said capacitor and an address select terminal connected to the other side of said capacitor, a first diode connected between said bit store terminal and a bit input terminal, a second diode connected between said bit store terminal and a bit output terminal, and a third diode connected between said bit store terminal and a reset terminal, means for holding said bit input terminal and said bit output terminal at a reference potential during reset condition, means for holding said address select terminal during said reset condition at a certain potential having a polarity that tends to make said first and second diodes nonconductive, and means for holding said reset terminal during said reset condition at a potential at least twice that of said certain potential and of a polarity tending to make said third diode nonconducting, means for storing a bit on said capacitor, said last means comprising means for momentarily changing the potential of said bit input terminal to substantially said certain potential and means for simultaneously changing the potential of said address select terminal substantially to said reference potential whereby current flows through said first diode and said capacitor receives a charge, and whereby said bit store terminal is at substantially twice said certain potential when said bit input terminal and said address select terminal are returned to their previous reset condition potentials, and means for reading out said stored bit, said last-named means comprising means for momentarily changing the potential of said address select terminal substantially to said reference potential whereby the potential of said bit store terminal is changed substantially to said certain potential resulting in no potential change at said bit output terminal, this being the generation of a bit output.

8. A bit storage circuit comprising a storage capacitor having a bit store terminal connected to one side of said capacitor and an address select terminal connected to the other side of said capacitor, a first diode connected between said bit store terminal and a bit input terminal, a second diode connected between said bit store terminal and a bit output terminal, and a third diode connected between said bit store terminal and a reset terminal, means for holding said bit input terminal normally at a reference potential and said bit output terminal at a certain other potential having a polarity tending to make said second diode conduct, means for holding said address select terminal normally at said certain other potential, and means for holding said reset terminal normally at a potential at least twice that of said certain other voltage and of a polarity tending to make said third diode nonconducting, means for storing a bit on said capacitor, said last means comprising means for momentarily changing the potential of said bit input terminal to substantially said certain other potential and means for simultaneously changing the potential of said address select terminal substantially to said reference potential whereby current flows through said first diode and said capacitor receives a charge, and whereby said bit store terminal is at substantially twice said certain other potential when said bit input terminal and said address select terminal are returned to their normal potentials, means for holding said bit output terminal at said reference potential during bit write-in, and means for reading out said stored bit, said last-named means comprising means for momentarily lowering the potential of said address select terminal substantially to said reference potential whereby said bit store terminal drops substantially to said certain other potential resulting in no potential change at said bit output terminal, this being the generation of a bit output.

9. A bit storage circuit comprising a storage capacitor having a bit store terminal connected to one side of said capacitor and an address select terminal connected to the other side of said capacitor, a first diode having its cathode connected to said bit store terminal and having its anode connected to a bit input terminal, a second diode having its cathode connected to said bit store terminal and having its anode connected to a bit output terminal, and a third diode having its anode connected to said bit store terminal and having its cathode connected to a reset terminal, means for holding said bit input terminal and said bit output terminal normally at substantially ground potential, means for holding said address select terminal normally at a certain positive potential, and means for holding said reset terminal normally at a positive voltage of a value at least twice that of said certain potential, means for storing a bit on said capacitor, said last means comprising means for momentarily raising the potential of said bit input terminal to substantially said certain positive potential and means for simultaneously lowering the potential of said address select terminal substantially to ground potential whereby said capacitor receives a charge, and whereby said bit store terminal is at substantially twice said certain potential when said bit input terminal and said address select terminal are returned to their normal potentials, and means for reading out said stored bit, said last-named means comprising means for momentarily lowering the potential of said address select terminal substantially to ground potential whereby said bit store terminal drops substantially to said certain potential resulting in no potential change at said bit output terminal, this being the generation of a bit output.

References Cited

UNITED STATES PATENTS

| | | | |
|---|---|---|---|
| 3,189,877 | 6/1965 | Pricer et al. | 340—173 |
| 3,197,689 | 7/1965 | Müller | 340—173 X |

OTHER REFERENCES

A. W. Holt, "The Diode-Capacitor Memory," N.B.S. Report No. 2940, 34 pp., November 1953.

BERNARD KONICK, *Primary Examiner.*

J. F. BREIMAYER, *Assistant Examiner.*